United States Patent [19]
Dahl et al.

[11] Patent Number: 5,191,019
[45] Date of Patent: Mar. 2, 1993

[54] CROSSLINKED HALOGEN-CONTAINING POLYMER

[75] Inventors: Roger Dahl, Stenungsund, Sweden; Steinar Pedersen, Porsgrunn, Norway; Jaan Roots, Oslo, Norway; Keith Redford, Hagan, Norway

[73] Assignee: Norsk Hydro a.s., Olso, Norway

[21] Appl. No.: 768,975

[22] PCT Filed: Feb. 8, 1990

[86] PCT No.: PCT/NO90/00033

§ 371 Date: Oct. 8, 1991

§ 102(e) Date: Oct. 8, 1991

[87] PCT Pub. No.: WO90/09407

PCT Pub. Date: Aug. 23, 1990

[30] Foreign Application Priority Data

Feb. 8, 1989 [NO] Norway .................................. 890543

[51] Int. Cl.$^5$ ................................................ C08F 8/00
[52] U.S. Cl. ..................................... 525/103; 524/506; 525/327.3; 525/342
[58] Field of Search ....................... 525/103, 342, 327.3

[56] References Cited

U.S. PATENT DOCUMENTS

| | | | |
|---|---|---|---|
| 4,091,048 | 5/1978 | Labana et al. | 525/203 |
| 4,314,043 | 2/1982 | Kojima et al. | 525/103 |
| 4,446,259 | 5/1984 | Vasta | 525/103 |
| 4,477,628 | 10/1984 | Kato et al. | 525/103 |

*Primary Examiner*—Bernard Lipman
*Attorney, Agent, or Firm*—Wenderoth, Lind & Ponack

[57] ABSTRACT

Method for production of a thermostable crosslinked halogen-containing polymer. Expoxygroups are added by way of a monomer as for example glycidylmethacrylate. The crosslinking of the polymer is carried out through an organic silane which can be hydrolyzed. By this method the crosslinking can be separated from the processing of the polymer as it is catalyzed by moisture after the processing is carried out. The crosslinking reaction is carried out very fast. Good thermostability is gained even if the halogen-containing monomer is vinylchloride.

14 Claims, No Drawings

CROSSLINKED HALOGEN-CONTAINING POLYMER

The invention concerns a method for production of thermostable crosslinked polymer. For a long time a slightly crosslinking of halogen-containing polymer, especially PVC, has been considered as an attractive method to improve the mechanical properties of the polymer at high temperatures. Many different technical solutions have been tried. For PVC .for example crosslinking by socalled reactive plasticizer has had a certain commercial progress. These normally are di- or trifunctional or methacrylates, which are normally added in amounts of 20–50 phr (phr=parts per 100 parts polymer). These will be crosslinked when being exposed to radiation or free radicals. They are making a relatively dense network which is grafted to the PVC-chains. The drawback with this system is that a strong heterogeneous network is introduced, this resulting in a considerable brittleness. At the same time the thermal stability of the polymer will be poorer by being exposed to radiation or free radicals (see for example W. A. Salmon and L. D. Loan, J. Appl. Polum. Sci, 16, 671 (1972)).

A fundamentally different method for crosslinking of PVC is to utilize the fact that the carbon-chlorine bond in PVC is polar, which results in the possibility to substitute the chlorine by a nucleophilic attack. Especially thiolations have turned out to be suited nucleophiles. (See for example W. A. Salmon and L. D. Loan, J. Appl. Polum. Sci, 16, 671 (1972)) Mori and Nakamura have described crosslinking of PVC by different dithioltriazines in several articles and patents. These have turned out to have suitable reactivity, volatility, poisonousness and level of smell which can vary with different substituents on the dithioltriazine. The crosslinking takes place through a metal salt of dithioltriazinc, especially magnesium—and natriumsalt has been used.

This method has not been any commercial success. This may have several explanations. The crosslinking reactions are started by heat. Flexible PVC is processed at temperatures being very close to the decomposition temperature of the substance. For unplasticised PVC the decomposition - and processing temperature are in the same range. This results in a very difficult balance by first processing of the material without obtaining crosslinking, at the same time as a rapid crosslinking started by heat shall be carried out afterwards. Either too many of the reactions occur during the processing when a rapid system is used, or the thermical load will be too large when a slow system is used. The "rapid" dithioltrazines, for example 2-dibutyamino - 4,6-dithioltriazine, in addition have proven to have a detrimental effect on PVC. This results in that a good working PVC-compound for crosslinking with good heat stability, hardly could be produced according to this method.

Another very interesting method is crosslinking of PVC by organic alkoxysilanes. By this method it is possible to separate the crosslinking from the processing by using a crosslinking reaction which is catalyzed by water. The processing then occurs in relatively dry state, for example by extrusion. The crosslinking is carried out in a following step, by supply of moisture in the shape of steam, hot or make it possible to produce a thermostable, crosslinked PVC. Several patent applications are filed concerning use of organic silanes for crosslinking of halogen-containing polymers, for example the use of mercaptopropyltrimetoxysilane (I) for crosslinking of PVC and its copolymers, as in the patent applications DE 3719151 Al and JP 55151049. According to this method the difunctionality of (I) is used in such a way that the mercaptogroups are added to the PVC-chain, and the alkoxysilane-groups are used for crosslinking by hydrolysis and following condensation to —Si—)—Si— bonds.

This method however has a weakness because the grafting to the PVC chains through the mercaptogroups not easily occurs. According to patent application DE 3719151 Al, an alkaline lead sulphate is needed to activate the mercaptogroups. Still very long period of time for crosslinking is needed according to the patent application. The examples mention intervals of 6 hours at 100° C. for a flexible PVC-compound. There is no information about thermostability.

The object of the invention thus is to produce a thermostable crosslinked halogen-containing polymer. It is essential to produce a polymer which can be processed without crosslinking taking place to any considerable extent. After processing it is essential that the crosslinking reaction can occur very fast by contact with water or steam. It is important that the polymer gain good stability at high temperatures. It is preferable to use different organic silanes for the crosslinking reaction.

These and other objects of the invention are gained with the process as described below, and the invention is characterized and defined by the following patent claims.

The present invention concerns a method for crosslinking of halogen-containing polymers by use of organic silanes. It is preferably used 0.05–15 parts by weight of a silane of the general formula

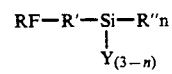

where
RF=a mercaptogroup, a primary or secondary amine, a carboxylic acid or anhydride.
R'+a $CH_2$,—$C_2H_4$—until—$C_8H_{16}$—group or another nonfunctional group.
R''=a group free of choise (not being hydrolyzed).
Y=one or more groups which can be hydrolyzed, for example —$OCH_3$, —$OC_2H_5$, —$OC_3H_7$, —$OC_4H_9$
n=0, 1 or 2.

The part which should be grafted to the polymer is a mercapto-, carboxylic acid- or amino-group or an anhydride. The crosslinking part is one or another form of alkoxysilane, for example trimethoxy-, dimethoxy-, triethoxy etc. As previously said it is know to use silanes for crosslinking. The characteristic feature with this method is that in the polymerisation of the halogen-containing polymer expoxygroups are introduced which easily can react with the organic silane. The epoxy groups are introduced by copolymerisation with a glycidyl-containing acrylate (GHA) for example glycidylmethacrylate (GMA) with VCM as an example. GHA shall make 0.05–10 by weight, preferably 0.5–3 % by weight of the total amount of monomer. Below 0.05 weight % the effect will be too small and above 10 % the polymerisation will be too slow. The polymerisation can be performed by suspension-, microsuspension-, emulsion- or mass-polymerisation.

Especially for suspensionpolymerisation at high temperature it has proven to be favourable not to add GMA before about 30 minutes of polymerisation, to obtain a stable suspension. By copolymerisation of VCM and GMA, GMA will be consumed relatively faster than VCM (shown by reaction constants). Because it is favourable to have such a uniform distribution of GMA in the polymer as possible, it is preferably being added at intervals during polymerisation. As GMA is rapidly consumed, it will not be concentrated in the monomeric phase, something obviously being an advantage.

By the use of a silane comprising a primary amine it is favourable to have a pre-reaction with an epoxy-comprising composition. The addition of metal oxides as for example magnesium oxide, prevents crosslinking during processing and has a positive effect to the thermostability.

The crosslinking reaction is carried out by exposure to water or steam. The crosslinking period can vary from some few minutes to a couple of hours depending on temperature and thickness. The finished product will contain 30–98 % copolymer of the halogen-containing polymer and glycidyl-containing acrylate, 0–70 % plasticizer, 0.05–10 % organic silane which could be hydrolyzed, 0.1–10 % stabilizer and 0–3 % lubricant. The content of glycidyl-containing acrylate in the copolymer will be 0.05–10 %.

The main reason for the poor thermal stability of PVC is defect structures as allylic and tertiary chlorine, as illustrated below.

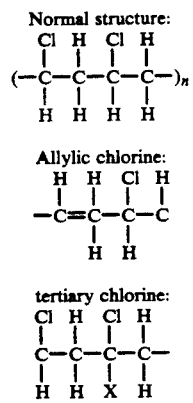

X = ethyl, butyl or long chain

These defect structures however give good possibilities for grafting to the PVC-chain, as these are considerably more sensitive to a nucleophilic attack, than the ordinary structure. There ought to be no doubt about that these first of all are being substituted. A mercapto-group can also add to the double bond created because of built-in defect structures or liberation of HCl. These defect structure at the beginning are not in such a number that a silane could be grafted to the polymer chains to such an extent that a network could exist. New defect sites arise as the material is exposed to thermal load, which occurs by liberation of HCl. These defect sites give new possibilities for grafting for example of mercaptopropyltrimetoxy silane (I). There is a possibility for the silane to actively contribute to this by a nucleophilic attack to the ordinary structure, resulting in that elimination of HCl occurs instead of the substitution. This is the source to an allylic chlorine which could be substituted. The consequence of this however, is a poorer thermostability during crosslinking.

The decisive difference between the method according to DE 3719151 A1 and JP 55151049 and the presently described method, thus is that the grafting to the PVC-chains also occur through the epoxygroups. The reaction is illustrated below using mercaptopropyltrimethoxy silane as the organic silane.

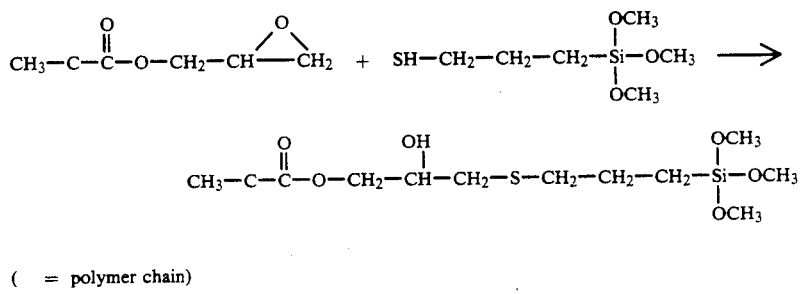

( = polymer chain)

It is no reason for assuming that the grafting through defect sites should cease. But, as shown in the examples below, these are not sufficiently many to give a correspondingly rapid crosslinking as by the use of copolymer with GMA.

The good access to grafting sites makes it easy for the organic silane to find the right place, and small amounts of organic silane can be used to obtain crosslinking in this case.

Also by the use of mercaptosilanes (for example mercaptopropyltrimethoxy silane) there will in certain cases surprisingly be needed an alkaline material, for example tribasic leadsulphate, for the reaction with the epoxygroups to occur, especially with small amounts of GMA in the polymer. This reaction however is taking place very fast. When aminosilanes (for example aminopropyltrimethoxysilane) are used, such a compound is not needed.

When the organic silane is grafted to the polymer chains, the crosslinking occur under influence of water by hydrolysis and condensation:

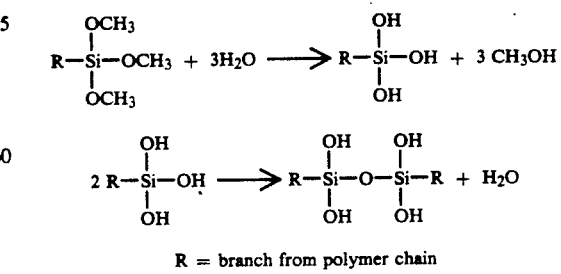

R = branch from polymer chain

The remaining silanol groups can react further and reinforce the network. The reactions will be the same with other alkoxy groups than methoxy groups.

The invention will be further illustrated by the following examples. During the experiments it has appeared that small additives of certain metal oxides, especially magnesium oxide prevent crosslinking during processing without negative influence to the crosslinking after steam- or water-treatment. Also lead, aluminium- or calciumoxide can be used for this purpose. These are added in an amount of 0.1 to 5 phr.

EXAMPLE 1

Eight different polymer compounds were produced as shown in table 1.

TABLE 1

| Compound | HP1 | HP2 | HP3 | HP4 | CP1 | CP2 | CP3 | CP4 |
|---|---|---|---|---|---|---|---|---|
| COMPOLYMER (1% GMA + VCM) | — | — | — | — | 100 | 100 | 100 | 100 |
| Homopolymer (VCM) | 100 | 100 | 100 | 100 | — | — | — | — |
| DOP | 40 | 40 | 40 | 40 | 40 | 40 | 40 | 40 |
| Interstab LF 3655[1] | 4 | — | — | — | 4 | — | — | — |
| Tribasic leadsulphate | — | 4 | 2 | 4 | — | 4 | 2 | 4 |
| Leadphthalate | — | 2 | 4 | 2 | — | 2 | 4 | 2 |
| Loxiol G70[2] | .5 | — | — | — | .5 | — | — | — |
| Stearic acid | — | 1 | 1 | 1 | — | 1 | 1 | 1 |
| Magnesiumoxide | — | — | — | 1 | — | — | — | 1 |
| Mercaptopropyltrimethoxysilane | 1.5 | 1.5 | 1.5 | 1.5 | 1.5 | 1.5 | 1.5 | 1.5 |

[1]commerical leadstabilizer and lubricant combination
[2]commerical lubricant of polyestertype
DOP = dioctylphthalate Four of the compounds comprise only VCM homopolymer while the rest are a copolymer of vinylchloride and glycidylmethacrylate. HP1 is identical to CP1, with the exception of the polymer, as HP2 is identical to CP2 etc.

These compounds were mixed and roll milled for 5 min. at 170° C. The resulting roll milled sheet were then exposed to steam at 120° C. in 30 min. to obtain crosslinking.

The following analysis were performed:

Stress relaxation (=SR) measured at 170° C. for roll milled sheet before and after exposure to steam. The ratio between the stress relaxation module initially and after 100 seconds was measured at 5% constant deformation. The measurement was carried out on a Reometrics RDS 7700. This method is especially favourable as the crosslinking reaction can be followed in an early phase within gel is produced and even how a produced gel is condensed can be seen. The value is given in percentage, and the higher the value is the more crosslinking sites (or larger molecules) are present in the material. As a number of socalled physical network tie points (crystallites) exist at the actual measuring temperature, the material has a "basic value" of 11–16 %.

Gel content (=Gel) (i.e. part of PVC being insoluble in solvent) was measured for material exposed to steam in tetrahydrofunrane (THF) at room temperature.

Thermal stability (=TS) was measured as Congo Red stability (also called VDE-stability) at 200° C. About 5 g material was finely chopped and put into a test tube which was placed into an oil bath of given temperature. The stability is given as the time until an indicator strip in the test tube shows that HCl is being liberated.

Penetration: Penetration as a function of temperature, was measured or a Mettler TMA. An indentor with a cross sectional areal of 7 mm$^2$ was pressed into the sample under constant load of 0.2N. The start temperature was 35°, the heating rate was 10°/min., the final temperature in the chamber 220° C., which gave the sample a final temperature of 204° C.

The results of the tests are shown in the following tables. Table 2 gives the result from the first three tests, while table 3 gives the results from the penetration test.

TABLE 2

| Compound | SR (%) f | SR (%) e | Gel (%) e | TS (min) f | TS (min) e |
|---|---|---|---|---|---|
| CP1 | 19.1 | 33.9 | 38.3 | 65 | 58 |
| HP1 | 16.8 | 23.0 | 0 | 85 | 85 |
| CP2 | 26.3 | 41.2 | 56.5 | 160 | 135 |
| HP2 | 18.6 | 28.0 | 0 | 186 | 167 |
| CP3 | 17.0 | 27.6 | 33.4 | 168 | 164 |
| HP3 | 16.2 | 24.2 | 0 | 190 | 191 |
| CP4 | 18.4 | 36.1 | 55.7 | 173 | 170 |
| HP4 | 16.9 | 24.8 | 0 | 208 | 204 | f = roll milled sheet before exposure to steam,
e = the same after exposure to steam, other abbreviations, see above

TABLE 3

| Compound | Thickness of sample (μm) | Penetration at 204° C. (μm) | The same in % | Max. penetration velocity (μm/s) (at temp) | Penetration velocity 204° C. (μm/s) |
|---|---|---|---|---|---|
| HP1 | 716 | 649 | 91 | 3.2 (195° C.) | 2.7 |
| CP1 | 517 | 115 | 22 | 0.6 (182° C.) | 0.2 |
| HP2 | 720 | 486 | 68 | 2.6 (190° C.) | 2.1 |
| CP1 | 678 | 142 | 21 | 0.5 (182° C.) | 0.2 |
| HP3 | 556 | 411 | 74 | 2.5 (195° C.) | 2.2 |
| CP3 | 689 | 316 | 46 | 1.4 (182° C.) | 0.8 |
| HP4 | 656 | 524 | 80 | 2.4 (195° C.) | 2.2 |
| CP4 | 658 | 150 | 23 | 0.6 (182° C.) | 0.4 |

The results shown above confirm in a convincing way that the copolymer of GMA and VCM by a wide margin is best suited for crosslinking with mercaptosilanes compared to PVC-homopolymer. The measurement of gel content, stress relaxation and penetration unambiguously show that under the conditions giving a chemical network with the copolymer, only a minor molecule enlargement is obtained with the homopolymer. The crosslinking reaction of the copolymer is very fast, other tests have shown that 10–15 minutes exposure to steam give as good results as 30 min. Further extension of the period of crosslinking up to 6 hours only give marginal changes.

A comparison between the results for CP2 and CP4 show the strongly retarding effect of magnesium oxide to the crosslinking during processing (rolling), without influencing the result after exposure to steam to any considerable extent. The thermal stability shows only a little deterioration compared to (not yet crosslinked)

homopolymer. The difference corresponds to not more than an addition of about 0.5 phr lead stabilizer. That a further improvement of the thermostability could be gained without making the crosslinking poorer, is illustrated by the following example.

EXAMPLE 2

TABLE 4

| Compound | CP5 |
|---|---|
| Copolymer (VCM:GMA 100:1) | 100 |
| DOP | 40 |
| tribasic leadsulphate | 6 |
| leadphthalate | 2 |
| stearic acid | 1 |
| Magnesiumoxide | 1 |
| mercaptopropyl-trimethoxysilane | 1.5 |

TABLE 5

| Compound | SR (%) f | SR (%) e | TS (min) f | TS (min) e |
|---|---|---|---|---|
| CP5 | 17.0 | 35.0 | 244 | 244 |

By addition of further stabilizer the thermal stability has been improved without the remaining properties being poorer. A Congo-Red thermal stability of 244 min. at 200° C. is more than the double of what is needed according to strict cable standards.

EXAMPLE 3

This example illustrates experiments performed with mixtures with varying amount of mercaptopropyl trimethoxysilane (I) added.

TABLE 6

| Compound | CP6 | CP7 | CP8 | CP9 | CP10 |
|---|---|---|---|---|---|
| Copolymer (VCM:GMA 100:1) | 100 | 100 | 100 | 100 | 100 |
| DOP | 40 | 40 | 40 | 40 | 40 |
| Interstab LF 3655 | 4 | 4 | 4 | 4 | 4 |
| Loxiol G70 | — | 0.5 | 0.5 | 1.5 | 1.5 |
| mercaptopropyl-trimethoxysilane (I) | 0.5 | 1.5 | 3.0 | 6.0 | 8.0 |
| Result: | | | | | |
| SR f (%) | 15.6 | 17.6 | 24.3 | 22.7 | 20.5 |
| SR e (%) | 16.6 | 32.0 | 47.7 | 55.2 | 54.7 |
| Penetration at 200° C. f (%) | | 74 | 27 | 32 | 25 |
| Penetration at 200° C. e (%) | | 18 | 8 | 6 | 5 |

By the use of a copolymer VCM-GMA (100:1) the high temperature qualities is quickly improved with increasing addition of until about 6 phr (I). Thereafter any minor changes occur. When the copolymer is indicated as VCM:GMA 100:1, it is meant the composition of monomeric phase. The amount of GMA in the polymer is about 1.25 %, because a complete usage of GMA and an average degree of conversion of 80% is calculated. By an addition of about 1.75 phr (I) a molar 1:1 ratio with (I) is gained. That larger supply of (I) gives effect, could be explained by the following: (a) The reaction between the epoxy- and mercapto group is improved by an excess of mercapto groups; (b) (I) which can not be grafted to the polymer chains through the mercapto group, could form bonds between molecules of (I) which are grafted to the chains; c) Reaction between (I) and labile chlorine, as described above. Large addition of (I) can also contribute to disintegration and formation of new labile chlorine.

EXAMPLE 4:

This example illustrates the result of variation of the GMA-content in the polymer. The composition of the compounds and the results of the tests are shown in table 7.

TABLE 7

| Compound | CP7 | KP7 | CP8 | KP8 |
|---|---|---|---|---|
| Copolymer (VCM:GMA 100:1.0) | 100 | — | 100 | — |
| Copolymer (VCM:GMA 100:0.5) | — | 100 | — | 100 |
| DOP | 40 | 40 | 40 | 40 |
| Interst. LF 3655 | 4 | 4 | 4 | 4 |
| Loxiol G70 | 0.5 | 0.5 | 0.5 | 0.5 |
| (I) | 1.5 | 1.5 | 3 | 3 |
| Result: | | | | |
| SR f (%) | 17.6 | 16.1 | 24.3 | 17.3 |
| SR e (%) | 32.0 | 22.8 | 47.7 | 29.6 |
| Penetration at 200° C. f (%) | 74 | | 27 | 72 |
| Penetration at 200° C. e (%) | 18 | | 8 | 32 |

The analysis are the same as for example 3.

The above results show that by lowering the content of GMA in the polymer with the half, the crosslinking is reduced and the high temperature properties is correspondingly poorer.

It is found that when VCM-GMA copolymers in combination with (I) are used, the preferred composition with (I) is VCM:GMA 100:0.1-10, especially 100:0.5-3 in combination with an addition of (I) of 0.1-10 phr, especially 0.5-6 phr, with the reference to raw material cost, polymerisation periode (GMA prolongs this) and gained effect.

The glycidylmethacrylate could be substituted by another glycidyl-containing acrylate as glycidylacrylate or buthylglycidyl acrylate where the copolymerisation factors $r^1$ and $r_2$ are of such a value that the acrylate is not concentrated in the monomeric phase during polymerisation.

During the experiments plasticizers and lubricants of ester or amide types has been used. Especially di-2-ethyl hexylphthalate, diocthyladipate, tricresylphosphate, tri-Linevol 79, trimellitate and tri-2-ethylhexyltrimellitate.

EXAMPLE 5:

There have also been performed experiments using aminopropyl trimethoxy silane (II) as crosslinking agent. The composition of the compounds are shown in table 8.

TABLE 8

| Compound | CP11 | CP12 |
|---|---|---|
| Cop. (VCM:GMA 100:1) | 100 | 100 |
| DOP | 40 | 40 |
| leadstab. | 6 | 6 |
| lubricant | 1 | 1 |
| aminopropyltri-methoxysilane (II) | 0.2 | 0.5 |

The compounds were processed and analyzed as in example 2. The results are shown in table 9.

TABLE 9

| Compound | SR (%) f | SR (%) e | TS (min) e |
|---|---|---|---|

TABLE 9-continued

| | | |
|---|---|---|
| CP11 | 16.4 | 17.8 |
| CP12 | 26.0 | 27.2 | 51 |

It is evident that (II) for the first gives crosslinking during processing, which also could be seen from the appearance of the roll milled sheet. This can be explained by the amine being difunctional and thereby can react with two epoxy groups. Aminopropyl trimethoxy silane also has a strong negative influence to the thermostability (normal value of TS with this stabilizing is about 180 min.) which can be due to that it as secondary and especially as tertiary amine, can give base catalyzed disintegration.

To avoid these problems a reaction was performed between the amine and one with regard to the content of epoxy, equivalent amount of epoxydated soya oil (ESO). The purpose was to block a reaction site on the amine and also add such a large substituent that this sterically should be able to prevent the base catalyzed disintegration. The reaction was carried out in this way:

1.25 g (II) and 4.75 g ESO (6% epoxy) was stirred into 40 g DOP. This was heated in a E-flask during stirring to 60° C. The mixture was held at this temperature for 30 minutes. The mixture is called DOP-mix in table 10 showing compositions and results.

TABLE 10

| Compound | CP13 | CP14 | CP15 |
|---|---|---|---|
| Cop. (VCM:GMA 100:1) | 100 | 100 | 100 |
| DOP | 40 | 24 | 8 |
| DOP-mix | — | 18.4 | 36.8 |
| Ca—Zn stabilizer | 2 | 2 | 2 |
| ESO | 1.9 | — | 0.5 |
| | SR | SR | TS |
| | (%) | (%) | (min) |
| Result: | f | e | e |
| CP13 | 11.0 | 11.9 | 20 |
| CP14 | 15.4 | 17.9 | 17 |
| CP15 | 21.7 | 27.5 | 15 |

By these experiments the degree of crosslinking during processing has been considerably lowered (CP14 corresponds to 0.5 phr (II), CP15 1 phr (II)). Besides, the negative influence of (II) on the thermostability has been reduced, especially considering that the help stabilizing effect of ESO has been used up when the DOP-mix is used. (Ca-Zn stabilizers give considerably worse thermostability when it is measured as Congo Red).

Instead of performing the crosslinking reaction by exposure to water or steam, inorganic compositions comprising crystal water in an amount of 0.1 to 5 phr could be added to the polymer compound. Especially $CaSO_4\ 2H_2O$ could be mentioned. The crystal water is liberated at the processing temperature or maximum 250° C. It is also possible to add drying agents as for example calcium sulphate or calcium chloride to the polymer compound to prevent crosslinking during processing.

By this invention a method for crosslinking of halogen-containing polymers through introduction of epoxygroups via a comonomer is brought forward. The crosslinking taking place by the help of an organic silane which could be hydrolyzed. By this method the crosslinking could be separated from the processing because it is catalyzed by water after finishing the processing. The crosslinking is done very fast. Very good thermostability can be gained even if the halogen-containing monomer is vinyl chloride (VCM).

What is claimed is:

1. A method for production of a thermostable crosslinked halogen-containing copolymer, where an organic silane is used as crosslinking agent and where the crosslinking is carried out in the presence of humidity, characterized in that a halogen-containing monomer is copolymerized with a glycidyl (epoxy)-containing acrylate and where 0.05-15 parts by weight of a silane

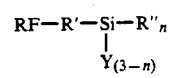

where
RF = a mercapto group, a primary or secondary amine, a carboxylic acid or an anhydride,
R' = a non-functional group,
R" = a non-hydrolyzed group,
Y = one or more groups which could be hydrolyzed,
n = 0, 1 or 2 is added and where the crosslinking is carried out after processing of the polymer.

2. A method according to claim 1, characterized in that the non-functional group R is $-CH_2-$ up to a $-C_8H_{16}-$group.

3. A method according to claim 1, characterized in that the group Y which could by hydrolyzed is $-OCH_3$, $-OC_2H_5$, $-OC_3H_7$, or $-OC_4H_9$.

4. A method according to claim 1, characterized in that a halogen-containing copolymer comprising 0.05-10% by weight of glycidyl-containing acrylate is produced.

5. A method according to claim 1, characterized in that the halogen-containing monomer is copolymerized with glycidylmethacrylate, glycidylacrylate or butylglycidylacrylate.

6. A method according to claim 1, characterized in that vinylchloride is used as the halogen-containing monomer.

7. A method according to claim 1, characterized in that a copolymer of vinylchloride and blycidylmethacrylate produced by suspension-, microsuspension-, emulsion- or mass-polymerisation is used.

8. A method according to claim 1, where the polymer is produced by suspension polymerisation, characterized in that the glycidylmethacrylate is added in intervals or continuously during polymerisation.

9. A method according to claim 1, characterized in that 0.1-5-phr of a metal oxide is added to the polymer.

10. A method according to claim 9, wherein the metal oxide is magnesium oxide.

11. A method according to claim 1, characterized in that silanes which contains a primary amine are prereacted with silanes which contain a primary amine are prereacted with epoxy-containing compositions in such a ratio that the epoxy group constitutes 20-150% by weight of the amino groups.

12. A method according to claim 11 in which the epoxy groups constitute 80-120% by weight of the amino groups.

13. A thermostable crosslinked copolymer produced according to the method as claimed in claim 1, characterized in that it comprises 30-98% by weight of a copolymer of a halogen-containing monomer and a glycidyl-containing acrylte, 0-70% containing monomer and a glycidyl-containing acrylate, 0-70% by weight of a plasticizer, 0.05-10% by weight of an organic silane which can be hydrolyzed, 0.1-10% by weight of a stabilizer and 0-3% by weight of a lubricant.

14. A copolymer according to claim 13, characterized in that the content of glycidyl-containing acrylate is 0.05-10% by weight.

* * * * *

UNITED STATES PATENT AND TRADEMARK OFFICE
CERTIFICATE OF CORRECTION

PATENT NO. : 5,191,019
DATED : March 2, 1993
INVENTOR(S) : Roger DAHL et al.

It is certified that error appears in the above-identified patent and that said Letters Patent is hereby corrected as shown below:

Column 1, line 31, after "(1972))" insert -- . --.

Column 2, line 7, "-Si-)-Si-)" should read -- -Si-O-Si- --.

Columns 3 and 4, lines 19-32, the formula should read as follows:

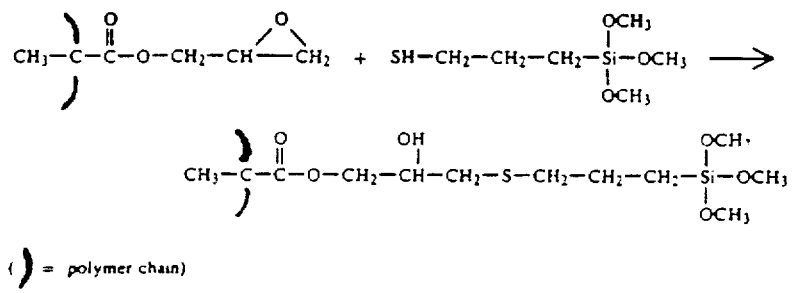

UNITED STATES PATENT AND TRADEMARK OFFICE
CERTIFICATE OF CORRECTION

PATENT NO. : 5,191,019
DATED : March 2, 1993
INVENTOR(S) : Roger Dahl et al

It is certified that error appears in the above-indentified patent and that said Letters Patent is hereby corrected as shown below:

Col. 10, claim 7, line 44, "blycidylmethacrylate" should read

--glycidylmethacrylate--.

Signed and Sealed this

Seventh Day of December, 1993

BRUCE LEHMAN

Attest:

Attesting Officer

Commissioner of Patents and Trademarks